Figure 1:
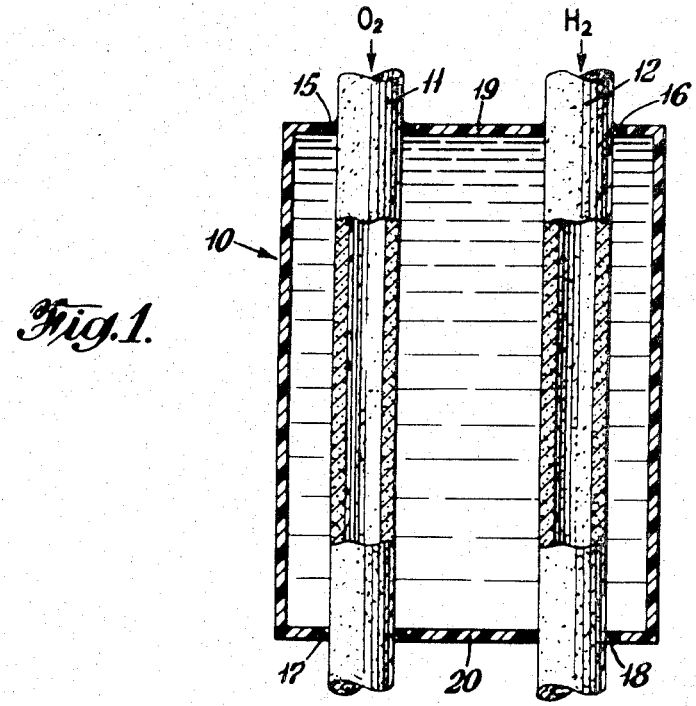

March 19, 1968

J. N. HOGSETT 3,374,121

PROCESS OF SUPPLYING HYDROGEN TO A FUEL
CELL WITH BOROHYDRIDE ADDUCT

Filed Nov. 27, 1964

INVENTOR.
JOHN N. HOGSETT

BY William R. Moran

ATTORNEY

United States Patent Office 3,374,121
Patented Mar. 19, 1968

3,374,121
PROCESS OF SUPPLYING HYDROGEN TO A FUEL CELL WITH BOROHYDRIDE ADDUCT
John N. Hogsett, Charleston, W. Va., assignor to Union Carbide Corporation, a corporation of New York
Filed Nov. 27, 1964, Ser. No. 415,221
23 Claims. (Cl. 136—86)

This invention relates to a fuel cell. In one aspect, this invention is directed to a fuel cell and an organic fuel which in combination produce electricity without requiring a large amount of weight and space.

A fuel cell may be considered as a primary galvanic cell, the basic reaction of which is the electrochemical oxidation of a fuel. The cells usually comprise a casing, a number of gas permeable, substantially inert anodes and cathodes in the casing, an electrolyte electrochemically connecting the anodes and cathodes, and supply means connected with each electrode on its side opposite the electrolyte for providing a continuous supply of gaseous fuel to the anodes and gaseous oxidant to the cathodes. The reactive gases diffuse through the electrodes to the electrolyte and then react electrochemically to provide an electric potential between the anodes and cathodes.

In the past, hydrogen has usually been used in the fuel, and oxygen or air as the oxidant, especially in cells which operate at low temperatures. These materials are readily available, and are relatively easy to handle. The hydrogen is stored in tanks, cylinders, or other generally voluminous containers, and then easily supplied to the electrodes through conduit means. Such an arrangement is practical in laboratory experiments and many commercial applications, but for some applications where space and weight are critical, for example, in a portable unit, the provision of hydrogen in this manner is not desirable due to the space and weight of the pressure cylinders required to store the hydrogen.

In order to avoid the problems inherent in the handling and storage of the fuel in its gaseous state, the use of various organic and inorganic compounds has been proposed as a source of hydrogen. For instance, organic compounds such as alcohols and sugars have been employed as a source of hydrogen. Moreover, hydrogen gas may be liberated from metal borohydrides by mixing an aqueous solution with them at a controlled rate. However, the violent chemical reactivity and thermal instability of the metal borohydrides, such as aluminum borohydride, beryllium borohydride and zirconium borohydride have created handling and storage problems which have precluded their serious consideration as sources of hydrogen gas.

For instance, aluminum borohydride and beryllium borohydride inflame violently in air and react vigorously with water. Moreover, beryllium borohydride suffers from the disadvantage of being extremely toxic. The density of aluminum borohydride being 0.55 gram/milliliter, at 25° C., further detracts from its desirability as fuel since large tankage would be required to provide a sustained supply of hydrogen gas. The disadvantages which result from increased weight due to large fuel storage tanks are obvious. In addition, though aluminum borohydride and beryllium borohydride are generally not regarded as shock-sensitive, there is little experimental evidence on this point since these materials are so difficult to handle in the test apparatus normally employed for such determinations.

In accordance with the invention, it has been discovered that the reaction of a metal borohydride, i.e., aluminum borohydride, beryllium borohydride, or zirconium borohydride, with various organic nitrogen compounds, results in novel adducts, described hereinafter, which have exceptional and valuable utility as a source of hydrogen for fuel cells. These novel adducts, as the fuel source, possess a combination of well balanced properties which render them especially suitable for fuel cell application. For instance, the physical properties of the novel adducts are dramatically more desirable than the corresponding metal borohydride per se. For example, the novel adducts are more stable, and less hazardous than the parent metal borohydride. Moreover, the densities of the aluminum borohydride adducts and the beryllium borohydride adducts are markedly higher than the density of the corresponding metal borohydride per se.

Thermal stability determinations conducted with various novel adducts such as, for example, N,N,N',N'-tetramethylmethylenediamine dialuminum borohydride show that at 70° C., said N,N,N',N'-tetramethylmethylenediamine dialuminum borohydride decomposed to the extent of 0.78 percent by weight in six days after which decomposition stopped, whereas the literature discloses that aluminum borohydride is completely decomposed at temperatures up to about 80° C. in five hours.[1] Moreover, said N,N,N',N' - tetramethylmethylenediamine dialuminum borohydride decomposed only to the extent of 2.8 percent by weight when heated for five hours over a temperature range which was progressively increased from about 25° C. to 228° C. Also, the densities of the novel adducts are, in general, markedly higher than the density of aluminum borohydride. For instance, the density of N,N,N',N'-tetramethylmethylenediamine dialuminum borohydride is 0.724 gram/milliliter, at 25° C., as compared to 0.55 gram/milliliter, at 25° C., for aluminum borohydride.

Accordingly, one or more objects will be achieved by the practice of the invention.

It is an object of this invention to provide a fuel cell and an organic fuel which in combination produce electricity without requiring a large amount of weight and space. A further object of this invention is to provide a novel fuel source for fuel cells. Another object is to provide a new and advantageous means for supplying hydrogen to fuel cells. A further object of this invention is to provide adducts of various metal borohydrides with organic compounds which are useful as a source of hydrogen. A still further object of this invention is to provide as a full source adducts of various metal borohydrides with organic compounds which are chemically and thermally stable. These and other objects will readily become apparent to those skilled in the art in the light of the teachings herein set forth.

In its broad aspect, the present invention is directed to a fuel cell for the electrochemical production of electricity. The cell comprises a fuel electrode, an oxidant electrode, an electrolyte electrochemically connecting the fuel and oxidant electrodes, oxidant in supply of the oxidant electrode, and as a source of hydrogen gas for the fuel electrode an adduct of a metal borohydride of the group consisting of aluminum borohydride, beryllium borohydride, and zirconium borohydride, with an organic nitrogen compound which is composed solely of carbon, hydrogen, and nitrogen atoms, said organic nitrogen compound containing at least one nitrogen atom which functions as a Lewis base.

In view of the large volume of hydrogen gas which can be released by the metal borohydride adducts, fuel cells which employ these compositions are particularly attractive and can be designed with a minimum of weight and space requirements. Moreover, due to the thermal stability and chemical reactivity of the adducts, their use is particularly attractive and far less hazardous than the corresponding metal borohydrides per se.

---
[1] Brokaw, R. S., and Pease, R. N., J. Am. Chem. Soc., 74, 1590 (1952).

As hereinbefore indicated, the compositions which are employed in this invention are adducts of metal borohydride, i.e., aluminum borohydride, beryllium borohydride, or zirconium borohydride, with an organic nitrogen compound which is composed solely of carbon, hydrogen, and nitrogen atoms. The organic nitrogen compounds which are employed as reagents in the preparation of the adducts are further characterized in that they contain at least one nitrogen atom which functions as a Lewis base. In accordance with the Werner coordination theory, these organic nitrogen compounds can be classified as ligands in that the resulting adducts, from a structural interpretation, can be characterized as containing at least one nitrogen to metal coordinate bond. It should be noted that if the organic nitrogen compound contains more than one nitrogen atom which can function as a Lewis base, at least one of said nitrogen atoms is coordinately bonded to metal (of the metal borohydride). In addition, the metal atom (of the metal borohydride) can be coordinately bonded to more than one nitrogen atom which function as a Lewis base. However, as indicated previously, the organic nitrogen compound must contain at least one nitrogen atom which functions as a Lewis base. It is preferred that the metal borohydride be aluminum borohydride or beryllium borohydride. Aluminum borohydride is especially preferred. It is further preferred that the organic nitrogen compound be an organic nitrogen compound which contains up to 6 nitrogen atoms in the molecule, and preferably still, a single nitrogen atom in the molecule. It is preferred, also, that any hydrocarbon substituents which are monovalently bonded to the nitrogen atom contain up to 12 carbon atoms, and preferably still, up to 3 carbon atoms. Methyl substituents on the nitrogen atom are highly preferred. It is further pointed out that the word "adduct(s)," as used herein including the appended claims is employed in its broadest sense and encompasses within its scope complexes, coordination compounds, chelates, and the like.

In one aspect, the adducts which can be employed in the invention can be represented by the following formula:

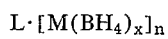

wherein L is an organic nitrogen compound composed solely of carbon, hydrogen, and nitrogen atoms, said organic nitrogen compound containing at least one nitrogen atom coordinately bonded to M; wherein M represents aluminum, beryllium, or zirconium; wherein $x$ is the valence of M; and wherein $n$ is an integer having a minimum value of one and a maximum value no greater than the number of nitrogen atoms contained in the organic nitrogen compound (L) which function as Lewis bases. Consequently, the maximum value of $n$ will be determined by the number of nitrogen to metal coordinate bonds present in the adduct. This in turn will be governed by the choice of the organic nitrogen compound and, in general, by the proportions of the reagents, i.e., organic nitrogen compound and metal borohydride, which are employed in the preparation of the adducts. For example, N,N,N',N'-tetramethyl-1,2-diaminoethane has two nitrogen atoms which can function as Lewis bases. Equimolar ratios of aluminum borohydride and N,N,N',N-tetramethyl-1,2 diaminoethane will react to yield a white solid adduct. On the other hand, a ratio of two moles, or more, of aluminum borohydride per mole of N,N,N'N'-tetramethyl-1,2-diaminoethane also yields a white solid adduct. Any aluminum borohydride in excess of the 2 to 1 molar ratio can be recovered as unreacted reagent. Thus, in the light of the preceding illustrations (as well as the operative examples in the specification), it is readily apparent that the number of nitrogen atoms which are capable of functioning as Lewis bases realistically governs the maximum value of the variable $n$ in the formula supra. It is highly preferred that L is an organic nitrogen compound composed solely of carbon, hydrogen, and one nitrogen atom the single nitrogen atom being coordinately bonded to aluminum, and that M is aluminum borohydride. It is preferred, also, than $n$ be an integer having a value greater than zero and less than 5, and preferably still, greater than one and less than 4.

The following discussion will serve to exemplify the various organic nitrogen compounds which can be reacted with aluminum borohydride, beryllium borohydride, or zirconium borohydride to prepare the adducts.

Formula I infra illustrates the diaminoalkanes

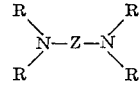

wherein Z is a divalent saturated aliphatic hydrocarbon radical and wherein each R, individually, is hydrogen or a monovalent hydrocarbon radical, e.g., alkyl, cycloalkyl, aryl, aralkyl, alkaryl, and the like, with the proviso that when Z is methylene then at least one of the R variables is a hydrocarbon radical. In a preferred aspect, Z contains from 1 to 6 carbon atoms, and preferably still, from 1 to 4 carbon atoms, e.g., methylene, ethylene ethylidene, propylene, propylidene, tetramethylene, etc., and each R, individually, is hydrogen or lower alkyl, e.g., methyl ethyl, n-propyl, isopropyl, n-butyl, sec.-butyl, t-butyl, and the like. In a highly preferred aspect, one or more of the R variables is methyl. Specific diaminoalkanes include, for example, 1,2-diaminoethane; 1,2-diaminopropane; the 1,2-, 1,3-, and 1,4-diaminobutanes; the 1,2-, 1,3-, 1,4-, and 1,5-diaminopentanes, the N-methyl-, N,N-dimethyl-, N,N,N'-trimethyl-, and N,N,N',N'-tetramethyl-1,2-diaminomethanes; the N-methyl-, N,N-dimethyl-, N,N,N'-trimethyl-, N,N,N',N'-tetramethyl-1,2-diaminoethanes; the N-methyl-, N,N-dimethyl-, N,N,N'-trimethyl-, and N,N,N',N'-tetramethyl-1,3-diaminopropanes; the N-methyl, N,N,-dimethyl-, N,N,N'-trimethyl-, and N,N,N',N'-tetramethyl-1,4-diaminobutanes; the N-methyl-, N,N - dimethyl-, N,N,N' - trimethyl-, and N,N,N',N'-tetramethyl-1,5-diaminopentanes; the N-ethyl-, N,N-diethyl, N,N,N'-triethyl-, and N,N,N',N'-tetraethyl-1,2-diaminoethanes; the N-ethyl-, N,N-diethyl-, N,N,N'-triethyl-, and N,N,N',N'-tetraethyl-1,5-diaminopentanes; N,N-dimethyl - N',N'-diethyl-1,2-diaminothane; N,N-dimethyl-N',N'-diethyl-1,3-diaminopropane; N,N-dimethyl-N',N'-diethyl-1,4-diaminobutane; N,N,N',N'-tetraisopropyl-1,3-diaminopropane; N,N,N',N'-tetra-n-butyl-1,4-diaminopentane; and the like.

Formula II infra illustrates the polyalkylene polyamines

II 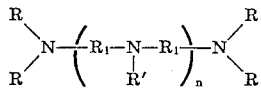

wherein each $R_1$, individually, is a divalent saturated aliphatic hydrocarbon radical which preferably contains up to 4 carbon atoms; wherein R' is hydrogen or a monovalent hydrocarbon radical, e.g., alkyl, cycloalkyl, aryl, aralkyl, alkaryl, and the like; preferably hydrogen or lower alkyl, and preferably still, hydrogen or methyl; wherein $n$ is an integer which has a value from 1 to 4; and wherein each R, individually, has the same meanings as set forth in Formula I supra. It is preferred that the moiety

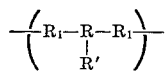

contain less than 10 carbon atoms. The polyalkylene polyamines include, by way of illustration, diethylenetriamine, triethylenetetramine, tetraethylenepentamine, pentaethylenehexamine, the polyethylenepolyamines, the polypropylenepolyamines, the polybutylenepolyamines, the polyethylenepolypropylenepolyamines, N,N,N',N'',N''-pentamethyldiethylenetriamine, N,N,N',N'-tetramethyldiethylenetriamine, N,N,N',N'-tetramethyltriethylenetetramine, hexamethylenetetramine, N,N,N', N', N'',N''-hexamethylhexamethylenetetramine, and the like.

Formula III infra illustrates the 1,3,5-hexahydrotriazine compounds

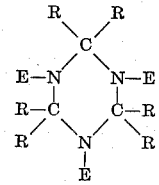

wherein each R, individually, is hydrogen or lower alkyl, preferably each R is hydrogen; wherein each E, individually, is hydrogen, alkyl, or the unit

each $R_1$ of said unit being hydrogen or alkyl. It is preferred that the $R_1$ variables of said unit are hydrogen or lower alkyl, e.g., methyl, ethyl, n-propyl, sec.-butyl, and the like. It is highly preferred that the $R_1$ variables are hydrogen or methyl. In lieu of the 1,3,5-hexahydrotriazine compounds depicted structurally in Formula III supra, the 1,2,4-hexahydrotriazine compounds and the 1,2,3-hexahydrotriazine compounds are similarly substituted. Specific 1,3,5-hexahydrotriazines include, for instance, 1,3,5-hexahydrotriazine, the lower alkyl substituted 1,3,5-hexahydrotriazines, the N-monoamino-, the N,N'-diamino-, and the N,N',N''-triamino-1,3,5-hexahydrotriazines wherein each of the aforementioned amino substituents can be

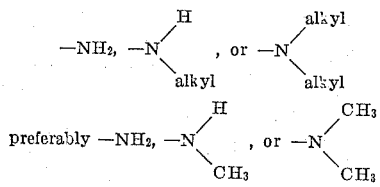

Illustrative tetrazene compounds are shown, in structural form, in Formula IV infra

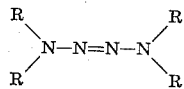

wherein each R, individually, is hydrogen or alkyl, with the proviso that at least one R variable is always alkyl. In a preferred aspect, each R is hydrogen or lower alkyl, e.g., methyl, ethyl, isopropyl, n-butyl, and the like. It is highly preferred that all the R variables are methyl groups. Specific illustrations include 1,1-dimethyl-2-tetrazene, 1,1,4,4-tetramethyl-2-tetrazene, 1,4-dimethyl-2-tetrazene, 1,4-diethyl-2-tetrazene, and the like.

Still other exemplary organic nitrogen compounds which can be reacted with aluminum borohydride, beryllium borohydride, or zirconium borohydride to prepare the novel adducts include, by way of representation, the hydrogenated 1,2,3-, 1,2,4-, and 1,3,5-triazines, e.g., the 1,2,3- 1,2,4-, and 1,3,5-dihydrotriazines; the 1,2,3- 1,2,4, and 1,3,5-tetrahydrotriazines; the 1,2,3-, and 1,2,4-hexahydrotriazines; the N-monoamino substituted 1,2,3-, 1,2,4,- and 1,3,5-dihydrotriazines; the N,N'-diamino substituted 1,2,3-, 1,2,4-, and 1,3,5-tetrahydrotriazines; and the N,N',N''-triamino substituted 1,2,3- and 1,2,4-hexahydrotriazines; wherein each of the foregoing amino substituents can be

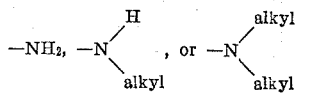

1,2,4,5-tetramethylhexahydrotetrazine;
hydrazidicarboimidine;
the hydrogenated diazines;
piperazine;
2-aminopyrrole;
2-(dimethylamino)pyrrole;
2,6-diaminopyridine;
2,6-di-(dimethylamino)pyridine;
2,4,5-tri-(dimethylamino)pyrimidine;
1,2-di-(dimethylamino)tetrahydropyrazole;
1,2,3-tri-(dimethylamino)tetrahydrotriazole;
1,2,4-tri-(dimethylamino)tetrahydrotriazole;
2,4,5-tri-(dimethylamino)hexahydropyrimidine;
N,N'-dimethylpiperazine;
N,N'-dimethyl-N,N'-diaminoethylene-diamine;
ethylene hydrazine;
N-(2-aminoethyl)hydrazine;
N-methyl-N-vinylhydrazine;
N,N,N',N'-tetramethylhydrazine;
the monoalkyl and polyalkylguanidines, e.g., N,N,N',N'-tetramethylguanidine, N,N'N''-triaminoguanidine, and N-methylguanidine;
N,N,N',N'-tetramethyl-1,4-diamino-2-butene;
N,N,N',N'-tetramethyl-1,4-diamino-2-butyne;
melamine;
2,4,6,8,9-pentazabicyclo[3.3.1]nonane;
tetrazole;
the polyaminoalkanes, e.g., 1,2,3-triaminopropane, 1,2,4-triaminobutane, 1,2,3-triaminobutane, and the like;
the monocycloalkylamines, e.g., cyclopentylamine, cyclohexylamine, and the like;
the substituted anilines, e.g., N-methylaniline, N-ethylaniline, N-isopropylaniline, N,N-diamethylaniline, N,N-diethylaniline, N,N-di-n-propylaniline, N-cyclohexylaniline, and the like;
and heterocyclic compounds which contain a single nitrogen atom in a heterocyclic ring, e.g., piperidine, carbazole, pyrrole, 3-isopyrrole, lower alkyl substituted piperidines, and the like.

Further illustrations include aniline, toluidine, xylidine, the N-lower alkyl substituted toluidines, and the like.

Highly preferred organic nitrogen compounds which can be employed include, for example, the mono-, the di- and the trialkylamines, and mixtures thereof, such as methylamine, ethylamine, n-propylamine, isopropylamine, n-butylamine, isobutylamine, t-butylamine, 2-ethylhexylamine, dodecylamine, dimethylamine, diethylamine, di-n-propylamine, diisopropylamine, di-n-butylamine, diisobutylamine, di-t-butylamine, di-2-ethylhexylamine, didodecylamine, and the like; and the trialkylamines, e.g., trimethylamine, triethylamine, triisopropylamine, tri-n-propylamine, tri-n-butylamine, tri-t-butylamine, tri-2-ethylhexylamine, tridodecylamine, and the like.

Illustrative adducts which can be employed in the fuel cells of the present invention include, among others,
N,N,N',N' - tetramethyl - 1,2-ethanediamine monoaluminum borohydride,
N,N,N',N' - tetramethyl-1,3-propanediamine monoaluminum borohydride,
N,N,N',N' - tetramethyl-1,2-propanediamine monoaluminum borohydride,
N,N,N',N' - tetramethyl - 1,4-butanediamine monoaluminum borohydride, N,N,N',N' - tetramethyl - 1,3-butanediamine monoaluminum borohydride,
N,N,N',N'-tetramethylmethylenediamine monoaluminum borohydride,
N,N,N',N'',N''-pentamethyldiethylenetriamine monoaluminum borohydride,
N,N'-dimethylpiperazine monoaluminum borohydride,
1,1,4,4-tetramethyl-2-tetrazene monoaluminum borohydride,
hexamethylenetetramine monoaluminum borohydride,
1,3,5-trimethyl-s-hexahydrotriazine monoaluminum borohydride,
N,N,N',N' - tetramethyl - 1,2-ethanediamine dialuminum borohydride,
N,N,N',N'-tetramenthyl-1,3-propanediamine dialuminum borohydride,
N,N,N',N' - tetramethyl - 1,4-butanediamine dialuminum borohydride,
N,N,N',N' - tetramethyl-1,3-butanediamine dialuminum borohydride,
N,N,N',N'-tetramethylmethylenediamine dialumium borohydride,
N,N,N',N'',N'' - pentamethyldiethylenetriamine dialuminum borohydride,
N,N'-dimethylpiperazine dialuminum borohydride,
1,1,4,4-tetramethyl-2-tetrazene dialuminum borohydride,
1,3,5-trimethyl-s-hexahydrotriazine dialuminum borohydride,
N,N' - dimethylmethylenediamine dialuminum borohydride,
ethylenediamine aluminum borohydride,
N,N,N',N'',N'' - pentamethyldiethylenetriamine trialuminum borohydride,
1,3,5-triamino-s-hexahydrotriazine trialuminum borohydride,
triaminoguanidine monoaluminum borohydride,
1,2,4,5-tetramethylhexahydrotetrazine tetraaluminum borohydride,
2,4,6-triamino-s-triazine trialuminum borohydride,
2,4,6-triamino-s-triazine dialuminum borohydride,
bis(tetramethylguanidine) monoaluminum borohydride,
1,3,5-triamino-s-hexahydrotriazine dialuminum borohydride,
methylamine monaluminum borohydride,
dimethylamine monoaluminum borohydride,
aniline monoaluminum borohydride,
piperidine monoaluminum borohydride,
N,N,N',N-tetramethylmethylenediamine diberyllium borohydride,
1,1,4,4-tetramethyl-2-tetrazene diberyllium borohydride,
N,N,N',N-tetramethyl-1,2-ethanediamine monoberyllium borohydride,
methylamine monoberyllium borohydride,
1,3,5-triamino-s-hexahydrotriazine triberyllium borohydride,
N,N,N',N'',N''-pentamethyldiethylene triamine triberyllium borohydride,
trimethylamine beryllium borohydride,
triethylamine beryllium borohydride,
methylamine zirconium borohydride,
dimethylamine zirconium borohydride,
trimethylamine zirconium borohydride,
1,1,4,4-tetramethyl-2-tetrazene dizirconium borohydride,
and the like.

The adducts which are used in the fuel cells of this invention can be prepared by contacting the metal borohydride with the organic nitrogen compound under an inert, anhydrous atmosphere, e.g., hydrogen, nitrogen, argon, helium, krypton, and the like. It is essential that impurities such as oxygen, carbon dioxide, carbon monoxide, water, and other materials which are reactive with the metal borohydride be avoided in the system in view of the highly hazardous and explosive nature of the borohydride reagent. The operative temperature can be in the range of from about −64° C., and lower, to below the boiling point of aluminum borohydride, e.g., from about −64° C. to 43° C. A preferred temperature range is from about 0° C. to about 30° C., and preferably still, from about 15° C. to about 25° C. The order of addition of the reagents does not appear to be narrowly critical. However, it is preferred that the metal borohydride be added to the organic nitrogen compound. Incremental isothermal addition of the metal borohydride to the nitrogen compound, with slow stirring, is highly preferred. If desired, the reaction mixture can be cooled to maintain the desired reaction temperature. The operative pressure can be subatmospheric, atmospheric, or moderately superatmospheric. In general, suitable results have been obtained by conducting the reaction below about 760 mm. of Hg pressure. It is preferred that the operative pressure be in the range of from about $10^{-3}$ mm. of Hg to about 760 mm. of Hg. For relatively large batch production of the novel adducts, it was observed that satisfactory results were obtained by effecting the reaction under essentially atmospheric pressure.

In view of the hazardous nature of metal borohydride, it is not preferred to have a large excess of unreacted metal borohydride present in the reaction product mixture. In the preparation of the novel liquid adducts, the preferred maximum concentration of metal borohydride is in slight excess of that quantity which is necessary to react with the organic nitrogen compound to produce the desired liquid adduct. On the other hand, when employing relatively high boiling organic nitrogen compounds to prepare the novel liquid adducts, the presence of unreacted nitrogen compound in the resulting reaction product mixture is undesirable since the resolution of said mixture, by distillation, could result in the thermal decomposition of the liquid adduct product. However, this disadvantage does not present itself when the resulting product is a solid adduct. In such cases, the solid adduct, if insoluble in the reaction product mixture, is readily recovered therefrom via filtration techniques. Should the solid adduct be soluble in the reaction product mixture, the addition of an inert, normally-liquid, organic vehicle thereto in which the solid adduct product is insoluble and the relatively high boiling organic nitrogen compound is miscible, would result in the precipitation of said solid adduct. The solid adduct then could be recovered by filtration procedures, as indicated previously. Subject to the variables illustrated above, it is desirable to employ an amount of metal borohydride which is slightly in excess of that required to react with the total amount of organic nitrogen compound to produce the desired liquid adduct, whereas it is desirable to employ an amount of organic nitrogen compound which is moderately in excess of that required to react with the total amount of metal borohydride to produce the desired solid adducts. However, it is preferred to employ essentially stoichiometric amounts of the reagents.

The reaction period will depend, to a significant extent, upon various factors such as the choice of organic nitrogen compound and metal borohydride, the concentration of the reactants, the operative temperature, the operative pressure, the manner of addition of the reactants, the use of an inert, normally-liquid, organic vehicle, and other considerations. Depending upon the correlation of the variables illustrated supra, the reaction period can range from several minutes to a few days. However, highly satisfactory results have been obtained by conducting the reaction over a period of from about 0.5 hour, and lower, to about 6 hours, and higher.

If desired, the reaction can be effected in the presence of an inert normally-liquid, organic vehicle, i.e., a vehicle which is non-reactive with the reagents or the resulting novel adduct product. Illustrative vehicles include, for example, the normally-liquid saturated aliphatic and cycloaliphatic hydrocarbons, e.g., n-pentane, n-hexane, n-heptane, isooctane, n-octane, cyclopentane, cyclohexane, cycloheptane, methylcyclohexane, ethyl-cyclopentane, and the like; the aromatic hydrocarbons, e.g., benzene, toluene, xylene, ethylbenzene, and the like; and other inert, normally-liquid, organic vehicles which would become readily apparent to one skilled in the art. The use of an inert vehicle permits the heat of reaction to be more evenly dispersed, thus minimizing the danger of inadvertently causing thermal decomposition of unreacted metal borohydride. This advantage is especially desirable when employing large quantities of reagents.

The adduct product can be recovered from the reaction product mixture by various procedures known to the art. For example, excess reagent and inert vehicle, if any, can be recovered from the reaction product mixture by distillation under reduced pressure, e.g., 10 to 15 mm. of Hg. The novel solid adducts also can be recovered from the reaction product mixture by filtration or crystallization techniques. Vacuum distillation is a preferred method of recovering the novel adduct product providing it can be vacuum distilled without decomposition.

In practice, the compositions of the instant invention can be employed as a source of hydrogen for a wide variety of fuel cells. The structural aspects of cells which utilize these compositions are not necessarily critical nor limited by the particular metal borohydride adduct employed. All that is needed is a storage chamber for the fuel, a zone wherein hydrogen can be generated, and means for conducting the hydrogen gas to the fuel electrode. In practice, hydrogen is generated from the aforementioned metal borohydride adducts by merely contacting the adduct with a suitable hydrolysis reagent. Illustrative reagents which can be employed include among others, water; alkanols, e.g., methanol; organic acids, e.g., alkanoic acids such as acetic, and inorganic acids such as sulfuric acid, nitric acid, phosphoric acid, hydrofluoric acid, and the like. The preferred hydrolysis reagent is sulfuric acid, particularly in a concentration of 10 weight percent. If desired, although not necessary, the adduct can be contained in a moderator, i.e., inert solvent, such as those previously indicated as suitable for the preparation of the adducts. When employed, the moderator is preferably used in a ratio of up to about 4 parts by volume of moderator per part of adduct. Additionally, a variety of catalysts such as cobalt chloride can optionally be employed to enhance the reaction. A variety of methods can be employed for the addition of reagent to metal borohydride adduct as well as means for controlling the rate of evolution. Such methods are known to those experienced in fuel cell technology and will depend, in part upon the physical state of the adduct, i.e., whether liquid or solid, the use of a moderator, catalyst, and the like.

Referring now to the drawing, FIGURE 1 illustrates a typical cell comprising a container 10 having an electrolyte therein and a hollow porous carbon cathode 11 and anode 12 immersed in the electrolyte. The cell electrodes pass through end covers 19 and 20 of container 10 and are secured thereon by circular seals 15, 16, 17 and 18. Suitable conduits (not shown) introduce the oxidant and hydrogen, respectively, through the cathode 11 and anode 12. In the practice of the invention, gaseous hydrogen is generated from the aforementioned metal borohydride adducts by reaction with a suitable conduit to anode 12. When the oxidant is air (or oxygen), the overall cell reaction is the oxidation of hydrogen to water. The respective reactions at the anode 12 and cathode 11 are as follows:

(1) 

(2) 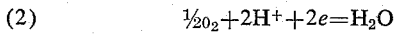

when hydrogen and oxygen are employed as the fuel and oxidant respectively, the electrolyte is suitably composed of an aqueous solution of potassium hydroxide. The oxidant, of course, is not restricted to oxygen and other suitable compounds can also be employed, such as for example, chlorine. With hydrogen and chlorine as the fuel and oxidant, an aqueous solution of hydrochloric acid is preferred as the electrolyte.

The electrodes 11 and 12 may be made of any suitable material which is sufficiently inert in the cell environment, which is reasonably electrically conductive, and which provides a support on which the electrochemical reactions can occur. It has been found that carbon fits these requirements very well, although nickel and other materials will also suffice. Moreover, the electrodes may have catalysts, such as the platinum metals, iron, nickel, and spinels, deposited thereon for promoting the electrochemical reactions. The electrodes 11 and 12 must also be gas permeable in order to permit the gas to reach the area where the electrode and electrolyte meet, but the electrodes must not be so porous that the electrolyte readily passes therethrough. Porosities of 30 to 35 percent have been found to be desirable. Of course, the exact porosity and pore size required in any given cell depends somewhat on the particular fuel and oxidant employed, the type of electrodes and electrolyte employed, and the particular operating conditions, such as temperatures and pressures.

For instance, the cell electrodes can be made by forming into shells a mixture of carbon black and pitch, such as 100 parts carbon black and 63 parts soft pitch along with 3 parts fuel oil. Thereafter the mixture is baked at about 1000° C. for about 6 hours. The raw tubes have a porosity of about 18 to 20 percent (measured by water saturation). The porosity is then increased to about 25 percent by exposing the shells to carbon dioxide at 800 to 1000° C. for 1 to 36 hours, or to steam at the same temperature for a period between 10 minutes and three hours. These electrode materials may also be made in sheet form or in the form of screens, meshes, or other types of porous bodies. The thickness of the electrode is not critical, sizes of from 1 mil up to ¼ inch or more having been operated satisfactorily as electrodes.

Thereafter, a spinel catalyst solution, which is preferably a 0.1 molar solution of cobaltous nitrate

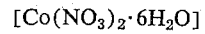

and aluminum nitrate [Al(NO₃)₃·9H₂O], is applied to the electrodes and decomposed by heat to form the pyrolysis product, which is probably a true spinel, CoO·Al₂O₃, on the carbon surfaces. The decomposition is preferably conducted in an oxidizing atmosphere, such as carbon dioxide, and at a temperature between about 850° C. and 950° C. The nitrogen oxides produced during the nitrate decomposition oxidize the electrodes and thereby increase the porosity of the electrodes to about 30 to 35 percent. At this point, the carbon tubes contain catalysts suitable for promoting oxygen dissociation.

The spinel deposition described above is fully explained in patents to A. Marko and K. Kordesch, U.S. Patent No. 2,615,932 and U.S. Patent No. 2,669,598 which issued on Oct. 28, 1952, and Feb. 16, 1954, respectively. Briefly, the process comprises impregnating a gas-permeable body, preferably made of an activated carbon, with a solution of at least one heat-decomposable salt of a heavy metal selected from the group consisting of iron, cobalt, nickel, manganese, chromium, copper, silver, gold, platinum, vanadium, titanium, uranium, thorium, and the rare earths, and at least one heat-decomposable salt of aluminum, and then heating the impregnated body to a temperature at which the salts decompose to form a catalyst. The spinels are insoluble in caustic electrolytes, and are at least partially conductive, which helps to minimize the resistance of an electrode as compared with other materials which are non-conductive.

In general, approximately stoichiometric amounts of the above salts are preferred so that a true spinel structure in the prolysis product is formed. The type of salt which is employed is not critical, but it should be one which decomposes without too much difficulty, and which possesses oxidizing properties. Nitrates and nitrites, i.e., the salts of nitric or nitrous acids, are preferred. Other salts which may be employed include those of chloric acid, chromic acid, oxalic acid, acetic acid, and formic acid. The temperature at which the spinels are formed is, in general, at least about 700° C., and usually lies between about 700° and 950° C. It has also been found that a spinel catalyst made from cobalt and aluminum salts provides the best catalytic action with respect to fuel cell reactions, especially since this catalyst is relatively insoluble in caustic electrolytes. Preferably, the spinels are deposited from a 0.1 molar solution.

A 10 percent aqueous solution of chloroplatinic acid ($H_2PtCl_6 \cdot 6H_2O$), rhodium trichloride ($RhCl_3$), or similar compounds is painted on the carbon shells which are to be used as anodes in the cell, and then thermally decomposed to the corresponding metal catalyst at a temperature below 200° C. Ten milliliters of such a solution are necessary to produce a (calculated) surface coverage of 2 mg. of metal per $cm.^2$ on a 12-inch electrode. The decomposition is usually performed in air, but a reducing (hydrogen) atmosphere may be advantageous if the electrode material tends to oxidize at temperatures below 200° C.

The metal catalyst may be one of the transition metals of Group VIII of the periodic table, or mixtures thereof. Broadly, the metal catalyst is deposited on the anode body by coating a salt of the platinum family metal or other metal on the body and then heating, preferably in a non-oxidizing atmosphere, to decompose the salt and deposit the metal catalyst in an active form. The exact state of the metal catalyst is not known, but it probably exists as either a pure metal, a suboxide, or a constituent of a complex catalyst consisting of it and the spinel. It was found, however, that the activity of the metal catalyst was reduced if it was deposited at temperatures higher than 200° C. In this regard, the presence of the spinel is advantageous since it helps to promote the decomposition of the salt of the metal catalyst at temperatures below 200° C. Ordinarily, the salt must be heated to over 300° C. for proper decomposition in the absence of promoters, and such high temperatures tend to cause undesirable sintering and deactivation of the metal catalyst.

The platinum family metals, i.e., platinum, palladium, iridium, ruthenium, osmium, and rhodium, are preferred as metal catalyst. Rhodium has the distinct advantage of not being poisoned by sulfur compounds or by cyanides, which are oftentimes introduced into the electrode body during manufacture.

The particular salt of these metals for use in the impregnation step is not critical, but it must be capable of decomposition below about 200° C. to form the metal catalyst. Chloroplatinic acid and rhodium trichloride are examples of suitable salts.

The concentration of the spinel catalyst is preferably within about 0.05 and about 0.2 weight percent spinel based on the weight of the electrode material, such as carbon, and the concentration of metal catalyst is preferably within about ¼ and 8 milligrams of metal catalyst per apparent square centimeter of surface area. Concentrations of about 0.1 weight percent spinel and about 2 mg./$cm.^2$ of metal catalyst are found to be the most active.

As hereinbefore indicated, the metal borohydride adducts can be employed as a source of hydrogen for a wide variety of fuel cells. It has been observed that in order to obtain 1 kilowatt of power from a fuel cell, 20 cubic feet of hydrogen are needed per hour. Thus, due to their ability to provide the necessary large volume of hydrogen gas per unit weight, they are particularly attractive for use in fuel cells wherein weight and fuel storage space must be minimized. For example, fuel cells employed to provide electricity for portable units, e.g., transmitters, must of necessity be limited in size and weight. The fuel cells which utilize hydrogen generated from the metal borohydride adducts can contain various regulators known to the art for controlling the reaction rate of the generator. Inasmuch as the rate of consumption of hydrogen gas by the fuel cell depends upon the external load and rate of current generation, the rate of hydrogen supply to the cell must be controlled to maintain the density within established limits. Various means such as a surge tank can be employed to control the rate.

Figure 2:
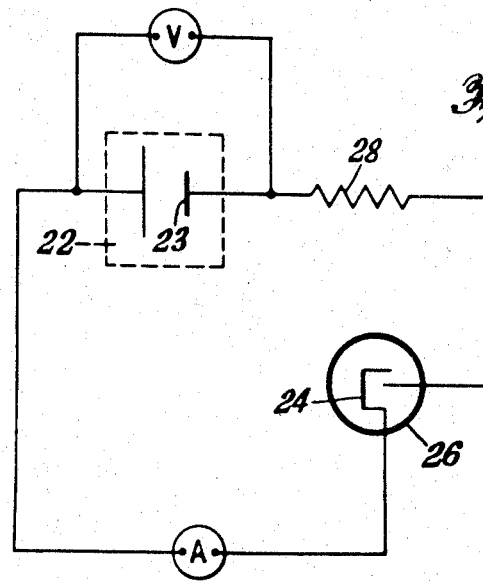

Various adducts of the meal borohydrides, hereinbefore described, were evaluated as a source of hydrogen for fuel cells using the circuit shown in FIGURE 2. The circuit consisted of a voltmeter in parallel across the test cell 22, and an ammeter connected to the positive side of the cell 22 and to the terminal 24 of a coulometer 26. A fixed resistor 28 completes the circuit between the cell 22 and the coulometer 26. In obtaining the test results, 50 percent KOH was used as the electrolyte. The open circuit voltages and the closed circuit voltages, both initial and after one hour on a 10 ma./$cm.^2$ current drain, are reported.

The following examples are illustrative:

*Example 1*

N,N,N',N'-tetramethyl-1,2-ethanediamine, 0.285 gram, 2.45 mmoles, was transferred by means of a hypodermic needle under a dry nitrogen atmoshpere into a reaction flask equipped with a standard taper joint and a Teflon coated magnetic stirring bar. The reaction flask then was attached to a high vacuum system, cooled with a liquid nitrogen bath, and evacuated to at least $10^{-4}$ mm. of mercury. Aluminum borohydride, 8.41 mmoles, was measured in a standard bulb and subsequently added in increments to the diamine. After each addition, the liquid nitrogen bath was removed and the reaction flask allowed to warm to room temperature. Stirring was initiated when the solid mixture turned liquid. The pressure above the liquid, as read by a mercury manometer attached to the reaction system, gradually decreased and white solid formation was observed which indicated that a reaction was occurring. From a pressure-composition plot of the reaction, it was readily apparent that the pressure in the reaction flask was very low until the mole ratio of aluminum borohydride to diamine reached two. Beyond this ratio (2:1), the pressure increased rapidly. At the 1:1 mole ratio of aluminum borohydride to diamine, no detectable vapor pressure which would be attributable to free diamine was observed. The aluminum borohydride in excess of a mole ratio of 2:1 (3.38 mmoles) was easily distilled from the reaction flask at room temperature in vacuo. Thus, 5.03 mmoles of aluminum borohydride reacted with 2.45 mmoles of 4D2 (mole ratio=2.05).

The resulting product was a white, non-volatile solid. Several drops of hydrazine was added to the solid causing the mixture to ignite and burn with a green flame, but it did not explode. Several crysals were struck vigorously with a steel hammer. No detonation occurred suggesting that it may not be shock sensitive.

*Example 2*

N,N,N',N'-tetramethyl-1,4-butanediamine, 0.527 gram, 3.36 mmoles, was transferred into a reaction flask as described in Example 1. The reaction flask was then attached to the high vacuum system, cooled with a liquid nitrogen bath, and evacuated to at least $10^{-3}$ mm. of mercury. Aluminum borohydride, 6.73 mmoles, was then measured in a standard bulb and added in about 7 equal portions to the diamine. After each portion was added, the reaction flask was slowly allowed to reach room temperature by removing the liquid nitrogen bath. After the first portion was added, the pressure in the flask gradually decreased and white solid formation was observed. At a 1:1 mole ratio of aluminum borohydride to diamine, no detectable vapor pressure which would be attributable to free diamine was observed. The resulting product was a white solid at said 1:1 ratio. As the mole ratio of aluminum borohydride to diamine exceeded one, the product remained a white solid. When the mole ratio of the reactants was 2:1, the product remained a white solid. At a 2:1 mole ratio of aluminum borohydride to diamine, no detectable vapor pressure which would be attributable to free diamine was observed.

*Example 3*

N,N'-dimethylpiperazine, 0.300 gram, 2.63 mmoles, was transferred in a dry nitrogen atmosphere into a 25 ml. reaction flask equipped as described in Example 1. The flask then was attached to the vacuum line, cooled with liquid nitrogen, and evacuated to at least $10^{-3}$ mm. of mercury. Aluminum borohydride, 5.58 mmoles, was measured in the standard bulb. Small portions of about 0.5 mmole of the borohydride were added periodically to the N,N'-dimethylpiperazine. After each addition, the reaction flask was allowed to warm to room temperature, after which the pressure gradually began to decrease. When the pressure no longer decreased, another addition of aluminum borohydride was made. White solids had formed in the reaction flask. At mole ratios of aluminum borohydride to N,N'-dimethylpiperazine of 1:1 and 2:1, the products were white solids. At these mole ratios, no detectable vapor pressure which would be attributable to free N,N'-dimethylpiperazine was observed. When the mole ratio of aluminum borohydride to N,N'-dimethylpiperazine exceeded 2:1, the pressure increased linearly in the reaction flask. The excess aluminum borohydride was easily distilled from the reaction flask at room temperature. Calculations proved that 5.17 mmoles of aluminum borohydride reacted with 2.63 mmoles of N,N'-dimethylpiperazine to form a non-volatile, white solid. The solid was allowed to stand in the atmosphere with no visible reaction having been observed. Several drops of hydrazine when added to a small amount of the 2:1 adduct caused an explosion.

*Example 4*

Hexamethylenetetramine, 0.154 gram, 1.10 mmoles, was added to a reaction flask and attached to the vacuum line as described in Example 1. Aluminum borohydride, 5.90 mmoles, was measured in a standard bulb and then a small amount (about 0.2 mmole) was added to the hexamethylenetetramine to make sure the reactants were compatible. No violent reaction was observed, so the rest of the aluminum borohydride was added and allowed to react, at room temperature, for 2 days. The excess aluminum borohydride, 4.72 mmoles, was then distilled from the reaction flask at room temperature leaving 1.18 mmoles having reacted with 1.10 mmoles of hexamethylenetetramine. The product was a white solid. Several drops of hydrazine when added to the white solid adduct caused an explosion.

*Example 5*

N,N,N',N' - tetramethyl-1,3 - propanediamine, 0.168 gram, 1.29 mmoles, was added to a reaction flask as described in Example 1. Aluminum borohydride, 2.92 mmoles, was added in about four equal parts to the diamine. The pressure inside the reaction flask was about 2 mm. of mercury until the mole ratio of aluminum borohydride to diamine was greater than two. The pressure then increased sharply. The product was liquid throughout the experiment. At mole ratios of aluminum borohydride to diamine of 1:1 and 2:1, no detectable vapor pressure which would be attributable to free N,N,N',N' - tetramethyl - 1,3 - propanediamine was observed. The aluminum borohydride in excess of a 2:1 mole ratio was easily distilled from the reaction flask at room temperature.

The non-volatile, clear, liquid adduct (2:1) was heated at 70° C. for one hour. There was a slight pressure buildup during this heating period, but the pressure suddenly decreased and the reaction product solidified, suggesting polymerization. A small amount of the adduct (solid), when exposed to the atmosphere, did not burn but is reacted slowly to give off a white smoke. A few drops of hydrazine reacted with the adduct causing an explosion. White fumes were evolved when several crystals were allowed to stand in the atmosphere, but there was no fire or detonation.

*Example 6*

To 1.95 grams, 19.1 mmoles, of N,N,N',N'-tetramethylmethylenediamine, 38.9 mmoles of aluminum borohydride was added slowly in the manner explained in the previous examples. The vapor pressure of the resulting product was about 5 mm. of mercury at 25° C. Further additions of aluminum borohydride resulted in a rapid pressure increase inside the reaction vessel which indicated that no further reaction was occurring. At mole ratios of aluminum borohydride to diamine of 1:1 and 2:1, no detectable vapor pressure which would be attributable to free N,N,N',N' - tetramethylmethylenediamine was observed. The aluminum borohydride in excess of a mole ratio of 2:1 was easily distilled from the flask. The products remaining consisted mostly of a clear non-volatile liquid, a small amount of white solid, and a small amount of a distillable liquid which when isolated decomposed into diborane and a white solid.

The non-volatile liquid was separated from the solids by filtering through a sintered glass disc. The clear liquid had a density of 0.9 g./ml. at 25° C., a shock sensitivity of 100 kg.-cm., could be handled easily in a dry nitrogen atmosphere, and fumed in air. The infrared spectrum showed strong absorption between $4-5\mu$ indicating the presence of boron-hydrogen linkages.

*Example 7*

1,1,4,4 - tetramethyl - 2 - tetrazene, 0.121 gram, 1.04 mmoles, was transferred into a 25 ml. reaction flask as described in the preceding examples. Aluminum borohydride, 1.304 mmoles, was transferred into the reaction flask which was cooled to −196° C. The liquid nitrogen bath then was removed, the flask was allowed to warm slowly to room temperature, and then stirred for 10 minutes. A white solid formed and 0.36 mmole of a gas collected which was noncondensable with liquid nitrogen. More aluminum borohydride, 2.14 mmoles, was added to the reaction flask as described above, allowed to warm to room temperature, and maintained thereat for a period of 30 minutes. The product in the flask was a liquid. More non-condensable gas (at −196° C.), presumably hydrogen, was collected in the Toepler pump. The total amount of hydrogen collected was 1.25 mmoles. The addition of more aluminum borohydride to the reaction flask did not result in any further reaction since the excess borohydride was easily distilled from the flask.

*Example 8*

1,3,5-trimethylhexahydrotriazine, 0.206 gram, 1.59 mmoles, was transferred into a reaction flask as described in the preceding examples. Small, measured amounts of aluminum borohydride were added thereto until a total of 4.82 mmoles was reached. The mixture of the triazine and borohydride was allowed to stand at room temperature for about two days, whereupon the unreacted aluminum borohydride was distilled from the reaction flask and measured. At mole ratios of aluminum borohydride to triazine of 1:1 and 2:1, no detectable vapor pressure which would be attributable to free 1,3,5-trimethylhexahydrotriazine was observed. At these ratios, i.e., 1:1 and 2:1, the products were a white solids. The non-volatile, white solid adduct (2:1) was very reactive with hydrazine. No visible reaction was noted when a small amount of this adduct was exposed to air to a short period.

Example 9

N,N,N',N',N'' - pentamethyldiethylenetriamine, 0.244 gram, 1.29 mmoles, was transferred into the reaction flask which was equipped as described in Example 1. Aluminum borohydride, 4.90 mmoles, was measured in the standard bulb and added in small increments to the triamine. The reaction flask was allowed to warm to room temperature and maintained thereat until the reaction was complete. At a mole ratio of aluminum borohydride to triamine of 1:1, the product was a white solid with a pressure above it of about 2 mm. of mercury at 26° C. At a mole ratio of aluminum borohydride to amine of 2:1, the product was also a white solid with a pressure above it of about 2 mm. of mercury at 26° C. At these mole ratios (1:1 and 2:1), no detectable vapor pressure which would be attributable to free triamine was observed.

An exact mole ratio of 3:1 of aluminum borohydride to triamine was stirred together for several days. The pressure decreased slowly indicating that further reaction was occurring. Because the reaction was slow, more aluminum borohydride (cumulative total=4.90 mmoles) was added for the purpose of increasing the pressure, which would in turn increases the rate of reaction.

Example 10

N,N,N',N' - tetramethyl - 1,3 - butanediamine, 6.71 mmoles, was added to 25 ml. reaction flask as described in Example 1. Aluminum borohydride, 6.71 mmoles, was measured into a standard bulb and then added to the reaction flask in seven equal portions. After each addition, the reaction flask was warmed from −196° C. to room temperature whereby the borohydride would readily react as indicated by a pressure decrease. At an exact mole ratio of 1:1, the product was a clear nonvolatile liquid. A small portion (0.0667 gram) gained 39 percent of its original weight when placed in air for 30 minutes. A drop of hydrazine added to a small amount of the adduct caused a fire which burned with a green flame. Heating 3.95 mmoles of the adduct at 70° C. for 65 hours produced 1.60 mmoles of gas in the reaction vessel. The adduct was not shock sensitive.

One mole of the 1:1 adduct was transferred into a reaction flask equipped with a magnetic stirring bar. Aluminum borohydride, 1 mmole, was added in about three equal parts to the reaction flask which was cooled to −196° C. After each addition, the contents of the flask were gradually allowed to warm to room temperature. When the mole ratio of aluminum borohydride to diamine was exactly 2:1, the pressure within the reaction system was 9 mm. of mercury at 25.5° C.

The 2:1 liquid adduct was gradually heated to 70° C. over a period of two hours. The adduct turned into a white solid and the pressure above the solid was 48 mm. of mercury, equivalent to 0.26 mmole of gas. Therefore, the solid corresponded closely to the composition of the liquid. When the 1:1 adduct was treated in a similar manner, no solid formation occurred. Continued heating of the 2:1 adduct at 70° C. for 65 hours resulted in the evolution of 2.86 mmoles of gas.

Example 11

Thirty-six grams of pure N,N,N',N'-tetramethylmethylenediamine was fed to a 500 ml. glass-jacketed reactor which was fitted with a thermocouple, liquid feed tank, agitator, condenser, and a nitrogen gas inlet tube. The reactor was also fitted with an outlet stopcock on the bottom to facilitate removal of the product, and the nitrogen outlet was fitted to a gas scrubber which contained 50 ml. of a tertiary amine to contain unreacted aluminum borohydride. Cooling water was applied to the jacket of the reactor and the temperature of the N,N,N', N'-tetramethylmethylenediamine was brought to 20° C. and maintained at this temperature during the feeding period. Aluminum borohydride was added dropwise to the reaction vessel until fifty grams had been added as denoted by the liquid volume of the borohydride. Addition of the first half of the aluminum borohydride was accompanied by a small amount of heat evolution; however, addition of the remaining aluminum borohydride was not exothermic and it was necessary to shut off the cooling water in order to maintain a reaction temperature of 20° C. An atmosphere of nitrogen was maintained in the reaction vessel during addition of the aluminum borohydride. After all of the aluminum borohydride had been added, the reaction was continued for a 3-hour period and then vacuum stripped for one hour at 50 mm. of mercury to remove any unreacted aluminum borohydride. The residues from the vacuum stripping operation were collected in two glass receivers maintained at liquid nitrogen temperatures. Sixty-nine grams of a liquid product were recovered from the reactor which had a composition as follows as determined by elemental analyses:

Calculated: [a] C, 24.6; H, 15.6; N, 11.4; Al, 22.0; B, 26.5. Found: C, 25.1; H, 15.8; N, 11.7; Al, 22.2; B, 26.2.

The physical properties of the liquid adduct are set forth in Table I infra.

TABLE I

| Name | N,N,N',N'-tetramethylmethylenediamine dialuminum borohydride |
|---|---|
| Structural Formula | Al(BH$_4$)$_3$·N(CH$_3$)—CH$_2$—N(CH$_3$)·Al(BH$_4$)$_3$ |
| Empirical Formula | C$_5$N$_2$H$_{38}$Al$_2$B$_6$ |
| Molecular Weight | 245.4 |
| Density, gm./ml. 20° C | 0.724 |
| Vapor Pressure, 25° C | 6.0 mm. Hg |
| Freezing Point, ° C | −75.[a] |
| Boiling Point, ° C | >200.[b] |
| Viscosity, Centipoises, 20° C | 7.19 |
| Heat of Formation, Kcal./gm. mole | +19.3.[b] |
| Thermal Stability, ° C | >120.[c] |
| Shock Sensitivity, Kg./cm | 120.[d] |
| Specific Impulse, lb./sec./lb | 313.[e] |

[a] Sets to glass at −75° C.
[b] Theoretical calculation.
[c] No decomposition for 24 hours under 1 atm. of nitrogen.
[d] Limit of detection by Olin Mathieson drop weight tester.
[e] At 1,000 p.s.i. expanded to 14.7 shifting equilibrium oxidized with N$_2$O$_4$.

Example 12

Twenty-two and four tenths grams of N,N'-dimethyl-1,2-ethanediamine were reacted with 49 milliliters of aluminum borohydride in the same manner as described in Example 11 except that the reaction was conducted at 10° C. in the presence of 200 milliliters of dry benzene. The reaction was allowed to proceed overnight (15 hours), at ambient temperatures, and the benzene was then removed from the product by vacuum stripping at 6.0 mm. of Hg pressure. A viscous liquid (47.5 grams) was recovered from the reactor. This product had a vapor pressure of about 3.0 mm. of Hg at 26° C. and was only very moderately reactive with air. The product had the following composition as determined by elemental analyses:

Calculated:[b] C, 20.7; H, 15.7; N, 12.1; Al, 23.3; B, 28.0. Found: C, 18.9; H, 17.0; Al, 25.4; B, 27.7.

Example 13

Isooctane was arbitrarily chosen as a solvent for studying the reaction of aluminum borohydride with ethylenediamine. Use of a liquid medium enables a more rapid and safer addition of aluminum borohydride by acting as a heat sink and a dispersing agent for the reactants.

Dry iso-octane, 5 ml., 3.45 grams, and ethylenediamine, 0.515 gram, 8.56 mmoles, were charged to a 25 milliliter

[a] Theoretical elemental composition of N,N,N',N'-tetramethylmethylenediamine dialuminum borohydride.

[b] Theoretical elemental composition of N,N'-dimethyl-1,2-ethanediamine dialuminum borohydride.

reaction flask equipped with a standard taper joint and a Teflon coated magnetic stirring bar. The flask was then attached to the high vacuum system, cooled with a liquid nitrogen bath, and evacuated to at least $10^{-3}$ mm. of mercury. Aluminum borohydride, 10.53 mmoles, was measured in a standard bulb and then added to the isooctane which was frozen with liquid nitrogen. The mixture was allowed to warm to room temperature and stirred until the pressure remained constant. The data are summarized in Table II infra.

TABLE II.—PRESSURE-COMPOSITION DATA FOR THE REACTION OF ALUMINUM BOROHYDRIDE WITH ETHYLENEDIAMINE IN ISOOCTANE AT 26° C.

| $Al(BH_4)_3$ Added, Cumulative mmoles | Mole Ratio, $Al(BH_4)_3$/ Ethylene diamine | Total Pressure, mm. of Hg. | Remarks |
|---|---|---|---|
| 1.00 | 0.172 | 68.0 | White solids forming. |
| 5.57 | 0.651 | 69.0 | More white solids. |
| 8.58 | 1.00 | 78.0 | More white solids; collected 0.598 mmoles of hydrogen. |
| 10.53 | 1.23 | 103.0 | Pressure not decreasing after reacting one day. |

The results indicate that the pressure remains relatively low and constant until the molar ratio of aluminum borohydride to ethylenediamine exceeds one, signifying that one mole of aluminum borohydride has reacted with one mole of ethylenediamine thus producing a white solid. When the molar ratio of one is exceeded, there was a relatively rapid increase in pressure which did not decrease with time. It was, therefore, concluded that no further reaction occurred. A small amount of hydrogen, 0.60 mmole, was formed during the reaction and can be attributed to slight quantities of impurities such as moisture, or to side reactions.

*Example 14*

A mixture of 150 ml. of dry benzene and 23.2 grams (0.20 mole) of 1,1,4,4-tetramethyl-2-tetrazene was fed into a 500 ml. glass-jacketed reactor which was fitted with a thermocouple, aluminum borohydride feed tank, agitator, condenser, and a nitrogen gas inlet tube. The reactor was also fitted with an outlet stopcock on the bottom to facilitate removal of the product, and the nitrogen outlet was fitted with a scrubber containing 50 ml. of a tertiary amine to prevent any unreacted aluminum borohydride from contacting air. Cooling water was applied to the jacket of the reactor and the temperature of the TMT was brought to about 10° C. and maintained at this temperature during the feeding period.

Aluminum borohydride was added dropwise to the reaction vessel until 28.6 grams (0.4 mole) had been added. The weight was determined by measuring a known volume of the liquid borohydride. The borohydride had to be added slowly or excess fuming occurred. As a mole ratio of 1:1 was approached the evolution of gas was not evident, but as more aluminum borohydride was added there did appear to be more bubbling out of the amine scrubber. After all of the aluminum borohydride had been added, the reaction was allowed to proceed overnight at ambient temperatures. The product was then collected in a filter flask under a dry nitrogen atmosphere and the benzene and excess aluminum borohydride were collected in two traps, maintained at liquid nitrogen temperature, by vacuum stripping (5 mm. of mercury) at about 25° C.

Forty-one grams of a very clear, liquid product was collected. The elemental analyses were:

Calculated,[c] percent: C, 18.5; H, 14.0. Found, percent: C, 20.4; H, 15.7.

*Example 15*

Using the same procedure and equipment as in Example 14, 28.6 grams (0.40 mole) of aluminum borohydride was added over a period of one hour to 23.2 grams (0.20 mole) of N,N,N',N'-tetramethyl-1,2-ethanediamine. A precipitate formed at first and then gradually disappeared as more aluminum borohydride was added. This observation indicates that the dialuminum borohydride adduct is more soluble in benzene than the mono adduct.

After the reaction was allowed to proceed at room temperature for several hours to insure completion, the benzene and any unreacted aluminum borohydride were vacuum stripped as described in Example 14. The product was a white solid whose elemental analyses were:

Calculated,[d] percent: H, 15.5; Al, 20.8; B, 25.1. Found, percent: H, 15.0; Al, 19.7; B, 22.2.

*Example 16*

The procedure used in this preparation was the same as that used in Example 12, except the reaction mixture was cooled to −20° C. by means of a glycol-water mixture.

The reaction flask was charged with 50.6 grams (0.683 mole) of N,N'-dimethylenediamine, and 97.8 grams (1.36 moles) of aluminum borohydride was very slowly added. When the first portions of aluminum borohydride were added, the reaction was very vigorous causing excess fuming. After about 20 grams of aluminum borohydride was added some of the solids which had formed began to turn liquid. The borohydride could be added faster from this point on, but caution still had to be exerted to prevent excessive fuming. The reactants were allowed to warm to room temperature and mix overnight after all the borohydride had been added.

The product, 136 grams, was collected in a filter flask and vacuum stripped at 50 mm. of mercury in order to distill off any excess aluminum borohydride present. The elemental analyses of the product were:

Calculated,[e] percent: Al, 24.9; H, 15.8. Found, percent: Al, 25.9; H, 13.6.

*Example 17*

In the manner described in Example 13 supra, aluminum borohydride, 4.43 mmoles, was added in increments to 4.30 mmoles of tetramethylguanidine (TMG) in 5.0 ml. of iso-octane and equilibria pressures recorded. The data are summarized in Table III infra.

TABLE III.—PRESSURE-COMPOSITION DATA FOR THE REACTION OF ALUMINUM BOROHYDRIDE WITH TETRAMETHYLGUANIDINE IN ISO-OCTANE AT 26° C.

| $Al(BH_4)_3$ Added, Cumulative mmoles | Mole Ratio, $Al(BH_4)_3$/ TMG | Total Pressure, mm. of Hg. | Remarks |
|---|---|---|---|
| 0 | 0 | 60 | 0.39 mmoles of $H_2$ evolved. |
| 1.49 | 0.347 | 59 | White solids present. |
| 2.83 | 0.654 | 59 | No $H_2$ evolved. More white solids. |
| 4.43 | 1.03 | 88 | Pressure not dereasing after reacting one day. |

From a previously determined pressure-composition plot of aluminum borohydride, it was determined that 2.2 mmoles of aluminum borohydride was unreacted. Consequently, 2.2 mmoles of the borohydride reacted with 4.3 mmoles of TMG in iso-octane at 26° C. to give a white solid. The hydrogen evolved during the reaction occurred only after the first addition of aluminum borohydride and can be attributed to a reaction with traces of moisture that were probably present.

*Example 18*

Using the same procedure and equipment as in Example 14, 14.3 grams (0.20 mole) of aluminum borohydride

---

[c] Theoretical elemental composition of 1,1,4,4-tetramethyl-2-tetrazene dialuminum borohydride.

[d] Theoretical elemental composition of N,N,N',N'-tetramethyl-1,2-ethanediamine dialuminum borohydride.

[e] Theoretical elemental composition of N,N'-dimethylmethylenediamine dialuminum borohydride.

was added over a period of one hour to 23.2 grams (0.20 mole) of N,N,N',N'-tetramethyl-1,2-ethanediamine.

The reaction was allowed to proceed at ambient conditions for several hours, after which the benzene was vacuum stripped as described in Example 14. A white solid product was obtained in a quantitative yield. The elemental analyses were:

Calculated,[f] percent: H, 15.0; Al, 14.7; N, 15.4. Found, percent: H, 15.0; Al, 14.3; N, 14.9.

The infrared spectrum of this compound was made and compared to that of N,N,N',N' - tetramethyl - 1,2-ethanediamine dialuminum borohydride.

Example 19

A 25 ml. reaction flask equipped with a magnetic Teflon stirring bar was attached to the high vacuum system with a standard taper joint. The reaction flask was flamed out in order to remove the last traces of moisture.

Aluminum borohydride, 1.12 mmoles, was transferred into the reaction system. Unsymmetrical dimethylhydrazine, 1.12 mmoles, was then measured in the standard bulb and subsequently added in small portions to the reaction flask, frozen with liquid nitrogen, containing the borohydride. After each addition, the liquid nitrogen bath was removed, the reaction flask gradually warmed to room temperature, and the reaction allowed to proceed until the pressure, as read on a manometer attached to the reaction system, remained constant. The reaction flask was then cooled with liquid nitrogen and the noncondensable gas, hydrogen (identity established by mass spectrographic analysis), collected and measured in a Toepler pump system. The reaction vessel was then warmed again to room temperature ~25° C. and the pressure recorded. The reaction vessel was then frozen again with liquid nitrogen, a portion of the amine added, and the entire procedure repeated. The experiment is summarized in the following table.

reaction vessel which was maintained at approximately 20° C. by an ice water bath. The reaction was complete as noted by the disappearance of the solid aluminum chloride after all of the 4 dl. amine had been fed to the reaction flask. A slurry of 9.4 grams of (90 percent) lithium borohydride in benzene was prepared by homogenizing the borohydride in 75 ml. of dry benzene under a nitrogen blanket. This slurry was then fed dropwise to the reaction mixture over a period of 1 hour while maintaining a reaction temperature of from 10–15° C. by means of a cold water bath. The reaction mixture was then allowed to warm to ambient conditions over a period of 2 hours and then heated to 50° C. for a period of 2 hours. The reaction mixture then cooled to 20° C. and the salts were filtered free of the liquid product by means of a sintered glass filter stick in a dry nitrogen atmosphere. The filtrate was placed back in the reaction vessel and the benzene solvent was stripped free of the product by a reduced pressure distillation at 70 mm. Hg pressure and a kettle temperature of 14° C. The vacuum stripping was discontinued when the kettle temperature began to rise and reached 24° C. Eighteen grams of a clear liquid having a density of 0.86 g./cc. at 20/20 were obtained as a product. The liquid was reactive with water but was not spontaneously combustible in air. The material was not shock sensitive at 100 kg./cm. The infrared spectrum of the material was comparable to the liquid product obtained in Example 6 except that it was contaminated with approximately 10 percent benzene and 15 percent of the unreacted dialuminum chloride addition compound of the amine as determined by reference spectrums of the pure materials. Elemental analysis of the liquid product gave the following composition:

Found: C, 31.1; H, 13.2; N, 9.9; Al, 18.8; B, 20.7; Cl, 8.9. Calculated: C, 30.1; H, 13.0; N, 9.7; Al, 18.8; B, 19.9; Cl, 8.6.

The elemental composition for the product closely ap-

REACTION OF UNSYMMETRICAL DIMETHYL-HYDRAZINE WITH ALUMINUM BOROHYDRIDE

| UDMH Added, mmoles | Mole Ratio UDMH/Al(BH$_4$)$_3$ | Hydrogen Collected, Cumulative mmoles | Mole Ratio H$_2$/UDMH | Comments |
|---|---|---|---|---|
| 0.167 | 0.150 | 0.356 | 2.13 | Colorless liquid noted. |
| 0.600 | 0.536 | 0.986 | 1.64 | Colorless liquid noted with a small amount of solid present. |
| 1.12 | 1.00 | 2.01 | 1.79 | Product mostly colorless, oily liquid with some white solid present. |

A very small amount of vapor, 0.073 mmole, which was either excess aluminum borohydride or UDMH or both, was removed causing the pressure above the product(s) to be 3 mm. Thus, a summary of the data shows that UDMH will react with aluminum borohydride in a mole ratio of 1:1 to give off 2 moles of hydrogen. The products were mostly a colorless, oily liquid and a white solid. A drop of anhydrous hydrazine added to the product(s) under a dry nitrogen atmosphere resulted in vigorous bubbling and the evolution of white fumes.

Example 20

Sixteen grams of dry aluminum chloride were added to a 3-necked reaction flask, which was fitted with a microhead, stirrer, Vigreux column, nitrogen bubbler with an outlet to several Dry Ice-acetone cold traps. The entire system was connected to a vacuum pump and manometer for reduced pressure distillation. Fifty ml. of dry benzene was fed to the reaction flask with agitation and nitrogen was admitted to the system at a slow bubble rate. N,N,N',N' - tetramethylmethylenediamine (4 dl.), 6.1 grams in 20 ml. of dry benzene, was fed dropwise to the

[f] Theoretical elemental composition of N,N,N',N'-tetramethyl-1,2-ethanediamine monoaluminum borohydride.

proximates the composition of the material estimated by infrared evaluation which indicates that the desired 4 dl.-dialuminum borohydride can be synthesized in this manner.

Example 21

Trimethylamine, 21.2 mmoles, and aluminum borohydride, 21.2 mmoles were condensed with liquid nitrogen into a reaction flask attached to a high vacuum system. The liquid nitrogen bath was replaced with a −80° C. bath and the reactants held at that temperature for two hours. The flask was then warmed to room temperature and stirred for 15 hours. The product was a mixture of a clear liquid and white solids. Hydrolysis of this mixture released only 74.3 percent of the theoretical hydrogen. The results of this experiment indicate two predominant products are formed in the reaction of aluminum borohydride with trimethylamine which is in contrast to the single products formed with other mononitrogen containing organic ligands.

Example 22

A mixture of 34.4 grams of n-butylamine contained in 150 ml. of dry benzene and 23.8 grams of aluminum borohydride contained in 150 ml. of benzene were reacted in the manner described in Example 11 supra. The aluminum borohydride-benzene admixture was added slowly to the n-butylamine-benzene admixture over a period of three hours, the resulting solution being maintained at about 5° C. The resulting solution then was allowed to react for 15 hours at room temperature, after which period of time the resulting reaction product mixture was stripped of benzene under 5 mm. of Hg at room temperature. The resulting product, i.e., n-butylamine monoaluminum borohydride adduct was a clear liquid having a trace amount of white solids.

ELEMENTAL ANALYSIS ($C_4H_{53}NAlB_3$)

| | Calculated, Percent: | Found, Percent: |
|---|---|---|
| H | 16.0 | 15.2 |
| N | 9.7 | 10.3 |
| Al | 18.7 | 19.3 |
| B | 22.5 | 24.3 |

Teflon coated magnetic stirring bar. The reaction flask was then attached to a high vacuum system, cooled with a liquid nitrogen bath, and evacuated to at least $10^{-3}$ mm. of mercury. Methylamine, 1.11 mmoles, measured as a gas, was then transferred into the reaction flask. Aluminum borohydride was added, in increments, to the methylamine-benzene solution. After each addition, the liquid nitrogen bath was removed, the reaction flask was allowed to slowly warm to room temperature and stirring was initiated. The pressure changes were observed with a mercury manometer attached to the system. When pressure changes were no longer observed, the reaction flask was cooled with liquid nitrogen and any non-condensable gas collected in a Toepler pump. The reaction flask was then warmed to room temperature and the pressure recorded. The results are summarized below:

| $Al(BH_4)_3$ Added Cumulative mmoles | Mole Ratio, $Al(BH_4)_3$/$CH_3NH_2$ | Total Pressure, mm. of Hg | $H_2$ Evolved, Cumulative mmoles | Remarks |
|---|---|---|---|---|
| 0.260 | 0.234 | 99.0 | Trace | Traces of white solids noted. |
| 0.931 | 0.841 | 101 | 0.191 | |
| 1.13 | 1.01 | 101 | 0.191 | Removed benzene; product white solids with vapor pressure of 3.0 mm. Returned benzene to flask. No $Al(BH_4)_3$ recovered. |
| 1.53 | 1.38 | 105 | 0.246 | |
| 1.99 | 1.79 | 110 | 0.246 | |

*Example 23*

A mixture of 18.6 grams (0.20 mole) of aniline contained in 100 ml. of dry benzene and 14.3 grams (0.20) of aluminum borohydride contained in 150 ml. of benzene were reacted in the manner described in Example 11 supra. The aluminum borohydride-benzene admixture was added slowly to the aniline-benzene admixture over a period of three hours, the resulting solution being maintained at about 4° C. The resulting solution then was allowed to react for 15 hours at room temperature, after which period of time the resulting reaction product mixture was stripped of benzene under 5 mm. of Hg at room temperature, i.e., 25° C. The resulting product, i.e., aniline monoaluminum borohydride adduct was a white solid.

*Example 24*

Ethylenediamine, 0.458 gram, 7.63 mmoles, was transferred by means of a hypodermic needle under a dry nitrogen atmosphere into a reaction flask containing five milliliters of dry benzene and a Teflon-coated magnetic stirring bar. The reaction flask was then attached to a high vacuum system, cooled with a liquid nitrogen bath, and evacuated to at least $10^{-3}$ mm. of mercury. Aluminum borohydride, 15.4 mmoles, was measured in a standard bulb and added in increments to the ethylenediamine. After each addition, the liquid nitrogen bath was removed and the reaction flask allowed to warm to room temperature. The first addition of aluminum borohydride resulted in the evolution of a small quantity of hydrogen which probably came from traces of moisture in the solvent. No more hydrogen was released upon further addition of aluminum borohydride.

The easily volatile materials were distilled at room temperature from the reaction flask after the reactants were mixed together for about 15 hours. The resultant white, solid, relatively nonvolatile product released 91.7 percent of the theoretical hydrogen upon hydrolysis with water at room temperature based on the formation of ethylenediamine dialuminum borohydride. The infrared spectrum showed strong absorption between 4–5$\mu$ indicating the presence of boron-hydrogen linkages. Analyses gave 26.0 percent by weight Al and can be compared to the theoretical percentage of 26.6 percent Al by weight.

*Example 25*

Five milliliters of dry benzene were transferred into a reaction flask equipped with a standard taper joint and a In a similar manner, the dimethylamine adducts with aluminum borohydride are prepared.

*Example 26*

Zirconium borohydride, 0.2481 gram (1.6471 mmoles) was condensed at liquid nitrogen temperatures into a reaction flask, under high vacuum. N,N,N',N'-tetramethylmethylenediamine (0.7959 millimole) was added, in increments, as a gas. Interaction of these two reactants resulted in the immediate formation of a reddish brown liquid residue. The reddish brown color is believed to be due primarily to impurities from stopcock grease carried into the reactant system during reagent addition.

The reaction product was a liquid which had a freezing point between 0° C. and 10° C. It had a vapor pressure of 10 mm. of Hg at 25° C. An infrared spectra was run on the adduct, FIGURE 4, and was almost identical to those adducts prepared with beryllium and aluminum borohydride except for very slight shifts in wavelengths in the B–H absorption region, 4–5$\mu$.

The product thus was identified as N,N,N',N'-tetramethylmethylenediamine dizirconium borohydride.

*Example 27*

An approximately equal mixture of the monomethylamine and dimethylamine adducts of aluminum borohydride containing 25 volume percent p-xylene were charged to the fuel chamber of a hydrogen generator. Ten weight percent sulfuric acid containing 1.5 grams of cobalt chloride per 150 milliliters of acid, was charged to the acid chamber. In this experiment, 4 milliliters of the acid solution combined with 2 milliliters of the adduct-xylene mixture to produce 3.49 liters of hydrogen gas over a ten minute period. This represented an 87 percent yield based on the theoretical value for the adduct.

*Example 28*

An approximately equal mixture of monomethylamine and dimethylamine adducts of aluminum borohydride, together with an equal volume of p-xylene, were charged to the fuel chamber of a stainless steel hydrogen generator. Ten weight percent sulfuric acid containing 10 grams of cobalt chloride per liter were charged to the acid chamber. Thereafter, the acid chamber was pressurized to about 6 pounds per square inch guage and the valve separating the chambers opened. The initial acid surge, approximately 5 milliliters per minute generated sufficient hydrogen gas to pressurize the reaction chamber closing the acid check valve and raising the pressure over the acid to the set value of the regulator (20 p.s.i.g.). As hydrogen gas was consumed by the fuel cell (wet test meter) the pressure in the reaction chamber dropped below 20 p.s.i.g. and additional acid was fed into the reactor until the generated hydrogen pressure once again closed the check valve. 55 liters of hydrogen gas were generated at a rate of about 0.5 liter per minute. This represented a yield of 92 percent based on the theoretical value for the adduct.

*Example 29*

To the reaction chamber of a hydrogen generator were charged 30 milliliters of an approximately equal mixture of the monomethylamine and dimethylamine adducts of aluminum borohydride and 30 milliliters of p-xylene. Ninety milliliters of 10 weight percent sulfuric acid containing 10 grams of cobalt chloride per liter was charged to the acid chamber. The generator unit was modified to provide three acid feed points spaced about 120° around the annular reaction chamber. Hydrogen gas was generated at a rate of 0.5 liter per minute and provided about 70 percent of the theoretical value based on the adduct. Chromatographic analyses of the gas showed that it was essentially pure hydrogen with only trace amounts of impurities.

*Examples 30–33*

In a manner similar to that employed in the previous examples, hydrogen for fuel cell use was generated from the metal borohydride adducts by contacting with a hydrolysis reagent. In some instances the use of acid and catalyst were eliminated and only sufficient xylene used to flush the fill line. The results obtained in four different runs are set forth in Table IV below:

0.87 volt at 2.5 amps to 0.785 volt at 2.2 amps. The hydrogen generator was charged with 180 milliliters of an approximate equal mixture of the monomethylamine and dimethylamine adducts of aluminum borohydride, 10 milliliters of p-xylene, and 720 milliliters of 10 weight percent sulfuric acid. The fully charged generator had a theoretical capacity of 600 watt-hours and supplied hydrogen to the cell at power levels ranging from 1.4 to 2.0 watts for a period of 10 days. The generator was depleted, as evidenced by a zero pounds per square inch guage pressure in the reaction chamber, after producing 392 watt-hours of power for an apparent yield of 65.2 percent. Cell voltage was 0.79 volt at 2.5 amps at this time indicating no detrimental effect of the generator hydrogen on cell performance.

Although the source of hydrogen gas for the fuel cells of the present invention are adducts of metal borohydrides with an organic nitrogen compound which is composed solely of carbon, hydrogen, and nitrogen atoms, other adducts of the metal borohydrides can also be employed. For instance, adducts of the aforementioned metal borohydrides with a ligand composed solely of carbon, hydrogen and oxygen atoms in which at least one oxygen atom is an etheric oxygen atom and which functions as a Lewis base can also be employed. For example such compounds as adducts of the metal borohydrides with isopropyl ether, 1,4-dioxane, 1,2-dimethoxyethane and the like.

Other compounds which can be employed include adducts of the aforementioned metal borohydrides with a ligand composed solely of carbon, hydrogen, boron, and amino nitrogen atoms, at least one amino nitrogen atom functioning as a Lewis base. Illustrative compounds in-

TABLE IV.—HYDROGEN GENERATION FOR FUEL CELLS

| Example | Adduct in Milliliters [1] | Moderator in Milliliters [2] | Hydrolysis Reagent in Milliliters [3] | Total Gas In Liters | Usable Yield in Percent | Running Time in Minutes | Gas Rate in Liters per Minute |
|---|---|---|---|---|---|---|---|
| 30 | 60 | 5 | 180 | 99.0 | 80.8 | 200 | 0.400 |
| 31 | 60 | 60 | 180 | 119.2 | 64.6 | 209 | 0.369 |
| 32 | 30 | 5 | [4] 90 | 56.2 | 91.5 | 128 | 0.402 |
| 33 | 20 | 5 | [4] 60 | 35.7 | 91.9 | 82 | 0.400 |

[1] Approximately equal mixture of the monomethylamine and dimethylamine adducts of aluminum borohydride.
[2] Xylene.
[3] 10 Weight percent sulfuric acid.
[4] Water only, no acid.

*Example 34*

In this experiment, a hydrogen generator was charged with 180 milliliters of an approximate equal mixture of the monomethylamine and dimethylamine adducts of aluminum borohydride, 10 milliliters of p-xylene, and 720 milliliters of 10 weight percent sulfuric acid. The fully charged generator had a theoretical capacity of 600 watt-hours and was used to supply hydrogen to a 100 watt fuel cell for a total of 3.1 hours over two different operating periods. During the first period (1.6 hours) the power level ranged from about 115 to 140 watts. Toward the end of this period, the hydrogen system was opened to the atmosphere for checking the operation. The generator was restarted after a 1.25 hour down period and ran for about 1.5 hours at a power level up to about 93 watts before shutdown. No significant difference was noted in the battery performance with cylinder hydrogen or generator hydrogen feed.

*Example 35*

In order to evaluate the effect of long term, low power level operation on fuel cell performance utilizing hydrogen generated from the metal borohydride adducts, a standard fuel cell was started on cylinder hydrogen and operated on this feed for about 13 days before switching to the generator hydrogen. During the period of operation on cylinder hydrogen cell voltage dropped from clude those wherein the ligand is tetra(dimethylamino)diboron, tetra(methylamino)diboron, and the like. A further class of adducts of the metal borohydrides which are suitable as a fuel source, are those wherein the ligand is composed solely of carbon, hydrogen, etheric oxygen, and amino nitrogen atoms, wherein at least one etheric oxygen atom or nitrogen atom functions as a Lewis base. Illustrative ligands include morpholine, 2,2′-bis(3-aminopropoxyethyl)ether, methoxyamine, and the like.

Although the invention has been illustrated by the preceding examples it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process for supplying hydrogen to a fuel cell which comprises contacting (1) an adduct of (a) a metal borohydride of the group consisting of aluminum borohydride, beryllium borohydride, and zirconium borohydride and (b) an organic nitrogen compound which is composed solely of carbon, hydrogen, and nitrogen atoms, said organic nitrogen compound being a Lewis base selected from the class consisting of amines and azines, and (2) a hydrolyzing agent, and supplying the resulting hydrogen to said fuel cell.

2. The process of claim 1 wherein said adduct of a metal borohydride has the formula:

$$L \cdot [M(BH_4)_x]_n$$

wherein L is an organic nitrogen compound composed solely of carbon, hydrogen, and nitrogen atoms; said organic nitrogen compounds containing at least one nitrogen atom coordinately bonded to M; wherein M is of the group consisting of aluminum, beryllium, and zirconium; wherein $x$ is the valence of M; and wherein $n$ is an integer having a minimum value of one and a maximum value equal to the number of nitrogen atoms contained in L which function as a Lewis base.

3. The process of claim 2 wherein M is aluminum.
4. The process of claim 2 wherein M is beryllium.
5. The process of claim 2 wherein M is zirconium.
6. The process of claim 1 wherein said adduct of a metal borohydride has the formula:

$$L \cdot [Al(BH_4)_3]_n$$

wherein L is an organic polynitrogen compound composed solely of carbon, hydrogen, and nitrogen atoms, at least one of said nitrogen atoms being coordinately bonded to aluminum, and wherein $n$ is an integer having a value greater than zero and less than 5.

7. The process of claim 6 wherein said hydrogen is formed from an adduct of aluminum borohydride and N,N,N',N'-tetra-alkyl-2-tetrazine.
8. The process of claim 6 wherein said hydrogen is formed from an adduct of aluminum borohydride and a diaminoalkane.
9. The process of claim 6 wherein said hydrogen is formed from an adduct of aluminum borohydride and polyalkylene polyamine.
10. The process of claim 6 wherein said hydrogen is formed from an adduct of aluminum borohydride and hydrogenated triazine.
11. The process of claim 6 wherein said hydrogen is formed from an adduct of aluminum borohydride and hexahydrotriazine.
12. The process of claim 6 wherein said hydrogen is formed from an adduct of aluminum borohydride and N,N,N',N'-tetramethyl-methylenediamine.
13. The process of claim 6 wherein said hydrogen is formed from an adduct of aluminum borohydride and N,N,N',N'-tetramethyl-1,2-diaminoethane.
14. The process of claim 6 wherein said hydrogen is formed from an adduct of aluminum borohydride and 1,1,4,4-tetramethyl-2-tetrazine.
15. The process of claim 6 wherein said hydrogen is formed from an adduct of N,N,N',N'',N''-pentamethyl-diethylenetriamine.
16. The process of claim 6 wherein said hydrogen is formed from an adduct of aluminum borohydride and N,N'-dimethylmethylenediamine.
17. The process of claim 6 wherein said hydrogen is formed from an adduct of aluminum borohydride and N,N',N''-triaminohexahydrotriazine.
18. The process of claim 6 wherein said hydrogen is formed from an adduct of aluminum borohydride and ethylenediamine.
19. The process of claim 6 wherein said hydrogen is formed from an adduct of aluminum borohydride and monomethylamine.
20. The process of claim 6 wherein said hydrogen is formed from an adduct of aluminum borohydride and dimethylamine.
21. The process of claim 6 wherein said hydrogen is formed from an adduct of aluminum borohydride with monomethylamine and aluminum borohydride with dimethylamine.
22. The process of claim 6 wherein said hydrogen is formed from an adduct of beryllium borohydride and alkylamine.
23. The process of claim 6 wherein said hydrogen is formed from an adduct of beryllium borohydride and diaminoalkane.

References Cited

UNITED STATES PATENTS 3,231,428  1/1966  Thompson _____ 136—86

ALLEN B. CURTIS, *Primary Examiner.*

BENJAMIN R. PADGETT, *Examiner.*

A. J. STEINER, *Assistant Examiner.*